United States Patent [19]
Yokoi

[11] 4,398,804
[45] Aug. 16, 1983

[54] LIQUID CRYSTAL DISPLAY UNIT

[75] Inventor: Gunpei Yokoi, Kyoto, Japan

[73] Assignee: Nintendo Co., Ltd., Kyoto, Japan

[21] Appl. No.: 170,020

[22] Filed: Jul. 18, 1980

[30] Foreign Application Priority Data

Apr. 22, 1980 [JP] Japan .............................. 55/55798[U]

[51] Int. Cl.³ .............................................. G02F 1/13
[52] U.S. Cl. ..................................... 350/337; 350/344
[58] Field of Search ........................ 350/337, 334, 344

[56] References Cited

U.S. PATENT DOCUMENTS

| | | | |
|---|---|---|---|
| 4,104,727 | 8/1978 | Washizuka et al. | 350/337 X |
| 4,105,292 | 8/1978 | Conder et al. | 350/344 X |
| 4,295,712 | 10/1981 | Ishiwatari | 350/337 X |

*Primary Examiner*—John K. Corbin
*Assistant Examiner*—Richard F. Gallivan
*Attorney, Agent, or Firm*—W. G. Fasse; D. F. Gould

[57] ABSTRACT

A reflection type liquid crystal display unit wherein twisted nematic liquid crystal molecules are used in a field effect mode. A polarizing sheet placed on the upper surface of the liquid crystal display element of the unit is formed with spacer projections geometrically distributed substantially over the entire surface area of the display unit by an embossing process, thereby defining a clearance of uniform predetermined thickness between the polarizing plate and the liquid crystal display element. As a result of this arrangement, formation of interference fringes known as Newton's rings is prevented.

3 Claims, 11 Drawing Figures

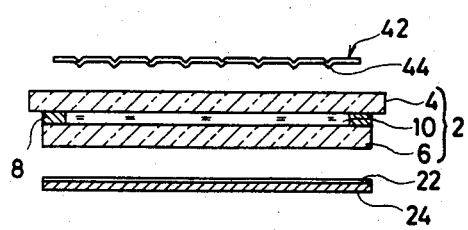
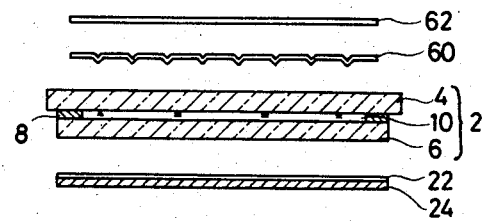
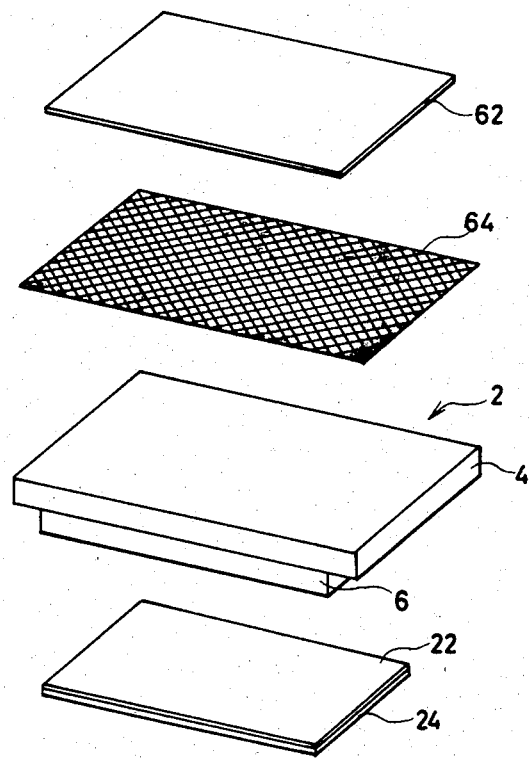

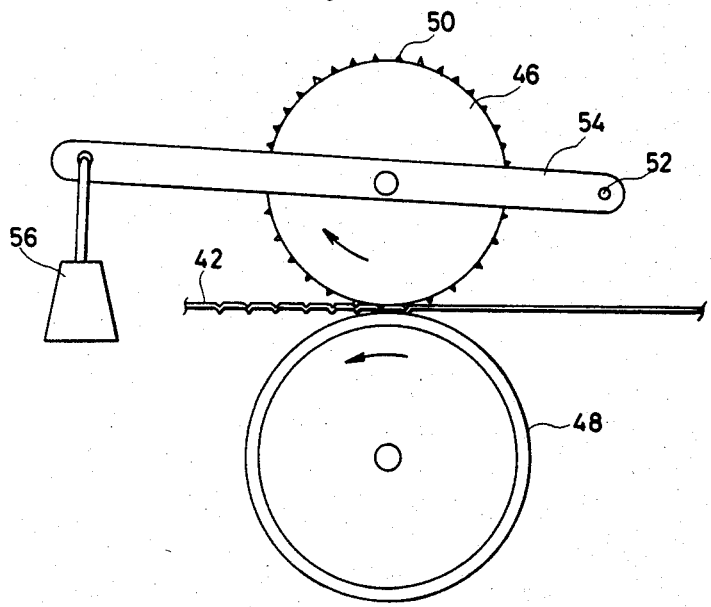
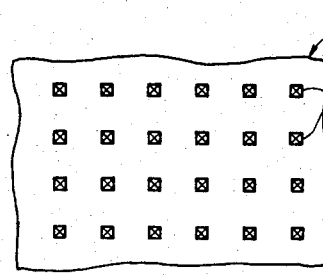
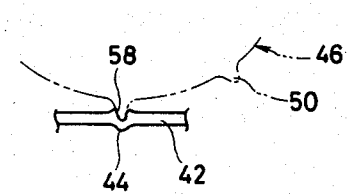

LIQUID CRYSTAL DISPLAY UNIT

BACKGROUND OF THE INVENTION

1. Field of the Invention;

This invention relates to a liquid crystal display unit and more particularly it relates to improvements in the visibility of a display produced by a reflection type liquid crystal display unit.

2. Description of the Prior Art

FIG. 1 is a perspective view of a typical conventional, reflection type liquid crystal display unit shown disassembled. This liquid crystal display unit includes a liquid crystal display element 2. The liquid crystal display element 2 includes a first glass sheet 4 and a second glass sheet 6. A spacer 8 made, e.g., of Mylar (trade name) is interposed between the first and second glass sheets 4 and 6. As a result, a thin clearance of about 10 microns is defined between the first and second glass sheets 4 and 6. The clearance is filled with a liquid crystal 10. One surface of the first glass sheet 4, namely, the surface opposed to the second glass sheet 6 is formed with transparent segment electrodes 12 in a desired pattern. Each electrode 12 has a lead wire 14 connected thereto and extending to a terminal 16. One surface of the second glass sheet 6, namely, the surface opposed to the first glass sheet 1 is formed with a common electrode 18. The common electrode 18 also has a lead wire connected thereto and extending to a terminal not shown. The electrodes 12 and 18 are made of a material which has a good adhesion to glass sheets and a high light transmissibility. For example, they are formed of a film of tin oxide.

The liquid crystal display unit shown in FIG. 1 is intended to be a liquid crystal display unit wherein twisted nematic liquid crystal molecules are used in a field effect mode. FIG. 2 diagrammatically shows the cross-sectional construction of such liquid crystal display unit wherein twisted nematic liquid crystal molecules are used in a field effect mode, such a unit being referred to below as a TN-FEM liquid crystal display unit. Referring to FIGS. 1 and 2, the liquid crystal display element 2 is sandwiched between two polarizing sheets 20 and 22. Each of the polarizing sheets 20 and 22 is in the form of a triacetate sheet formed with a film having polarizing characteristics. In FIGS. 1 and 2, the lower surface of the lower polarizing sheet 22 has a reflecting sheet 24 bonded thereto. Therefore, the liquid crystal display unit shown in these figures is of the reflection type. The reflecting sheet 24 may, for example, be an aluminum foil.

FIG. 2 illustrates the various elements on a nonactual scale to give a better understanding of the operation of the TN-FEM liquid crystal display unit. For example, the thickness of the clearance filled with the liquid crystal 10 is shown in an exaggerated manner. In liquid crystal display units of the TN-FEM type, the liquid crystal molecules 26 are disposed in a twisted state. In this state, if voltage is applied between a pair of opposed electrodes 12 and 18, the liquid crystal molecules are lined up in the direction of the electrostatic field, losing their optical activity. FIG. 2 shows a voltage being applied between a pair of electrodes 12 and 18. When the electrostatic field disappears, the liquid crystal molecules 26 return to the twisted state.

Referring to FIG. 2, the principle of operation of the reflection type TN-FEM liquid crystal display unit will now be described. In addition, it is assumed that the respective polarization axes of the polarizing sheets 20 and 22 are at right angles to each other. Unpolarized, external light falls from the top of FIG. 2 upon the polarizing sheet 20, where it is polarized in a first direction. Therefore, the light incident upon the liquid crystal 10 has been polarized in the first direction. If voltage has been applied between a pair of electrodes 12 and 18, then the liquid crystal molecules 26 in the corresponding region are in the illustrated aligned state. Therefore, the light incident upon this portion passes through the liquid crystal 10 and falls upon the lower polarizing sheet 22. The lower polarizing sheet 22 has an axis of polarization extending in a second direction which is at right angles to the first direction. As a result, the light which has been transmitted from the upper polarizing sheet 20 through the liquid crystal 10 is completely cut off. Therefore, no light reaches the reflecting sheet 24 and no reflected light is obtained from the latter, whereby the display looks dark. On the other hand, the light which falls upon other regions than that described above is gradually polarized by the corresponding liquid crystal molecules 26 which have optical activity, with the result that when passing through the liquid crystal 10, the light has been polarized through 90 degrees as compared with the incident light. Thus, the light incident upon the lower polarizing sheet 22 has been polarized in the second direction and passes through the polarizing sheet 22. Therefore, this light reaches the reflecting sheet 24, where it is reflected. The reflected light passes through the polarizing sheet 22 and in the liquid crystal 10 its direction of polarization is restored to the first direction. Therefore, the light passes through the upper polarizing sheet 20. Thus, the display looks bright outside the electrodes 12, 18. On such principle of operation of the display unit, voltage-applied regions look dark, while those having no voltage applied thereto look bright, and the contrast between the dark and bright regions makes the desired display possible.

Attention is invited to the cross-section of the liquid crystal display unit shown in FIG. 2. On the side of the liquid crystal display unit nearer to the viewer, the substantially light transmissible polarizing sheet 20 overlies the first glass sheet 4 which is a flat glass sheet. The surface conditions of the upper surface of the first glass sheet 4 and the lower surface of the polarizing sheet 20 will now be considered. The surfaces of the two sheets must be truly smooth and flat, for, if not, a problem illustrated in FIG. 3 would be caused.

FIG. 3 is a diagram on an enlarged scale for explanation of a problem with conventional liquid crystal display units. Referring to FIG. 3, the laminated state of a first glass sheet 4 and a polarizing sheet 20 is depicted. In such state, if the upper surface of the first glass sheet 1 and the lower surface of the polarizing sheet 20 do not form true planes, a clearance 28 is formed. It will be understood that the presence of such a clearance 28 produces interference fringes known as Newton's rings. Such interference fringes are caused by the fact that an incident light ray 30 to be reflected by the lower surface of the polarizing sheet 20 and another incident light ray 32 to pass through the polarizing sheet 20 and be reflected by the upper surface of the first glass sheet 4 interfere with each other when so reflected. The formation of such interference fringes makes it difficult for the viewer to see the display. Particularly in a display unit adapted to be viewed with the aid of environmental light coming from outside without using a particular light source as in a reflection type liquid crystal display unit, occurrence of interference fringes which hinder viewing, must be prevented.

In order to prevent the formation of the clearance 28 shown in FIG. 3, the upper surface of the first glass sheet 4 and the lower surface of the polarizing sheet 4 must be truly flat. In this case, making the upper surface of the first glass sheet 4 is a machining problem and is not impossible if surface grinding is performed with the greatest care. Making the lower surface of the polarizing sheet 20 truly flat, however, involves not only a machining problem, it is also related to the material of the polarizing sheet 20. For example, if the polarizing sheet 20 contains a resin such as triacetate, problems other than a machining problem one are liable to occur. Triacetate is hygroscopic and expands and contracts to a certain extent, so that it is liable to warp. Therefore, no matter how truly a flat surface may be formed in the machining step, it will eventually be deformed into a curved surface.

FIG. 4 shows the cross-sectional construction of a prior art liquid crystal display unit which is of interest to the present invention. In order to prevent occurrence of interference fringes described above, the polarizing sheet 20 may be spaced apart from the first glass sheet 4 sufficiently to preclude Newton's rings. Referring to FIG. 4, the polarizing sheet 20 is disposed on the first glass sheet 4 through a spacer 36. The spacer 26 is formed, e.g., by punching a plastic film about 0.5 mm thick in a picture frame fashion. This spacer 36 prevents contact between the polarizing sheet 20 and the first glass sheet 4. Therefore, the formation of interference fringes due to Newton's rings is advantageously prevented. In addition, the liquid crystal display unit shown in FIG. 4 is the same as the one shown in FIGS. 1 and 2 except for the arrangement described above. Therefore, like parts are given like reference numerals and a description thereof will be omitted.

The construction shown in FIG. 4 has drawbacks. For example, if such display unit has a small or elongated display face, the spacer 36 can be advantageously used. More particularly, even a spacer having a thickness of only about 0.5 mm is effective to prevent contact between the polarizing sheet 20 and the first glass sheet 4 over the entire area regardless of a possible warp of the polarizing sheet 20. In the case of the display unit having a large display face, however, it is impossible for a spacer about 0.5 mm thick to prevent contact between the polarizing sheet 20 and the first glass sheet 4. Such display unit having a relatively large display face is used, e.g., in a game device shown in FIG. 5.

Referring to FIG. 5, a display face 40 is provided on top of the housing 38 of the game device. The size of the display face 40 could be inferred from the housing 38 measuring, e.g., 5 cm long by 9 cm broad. Thus, it will be understood that the display face 40 shown therein is greater than the display face of at least a wristwatch, a portable small electronic computer or the like. If a liquid crystal display unit having a construction such as shown in FIG. 4 is used to form such display face 40, it is necessary to increase the thickness of the spacer 36 to provide a sufficient clearance between the polarizing sheet 20 and the first glass sheet 4 to ensure that the polarizing sheet 20 will not contact the first glass sheet 4 when warping. However, such increase in the thickness of the spacer 36 is not desirable since it increases the overall thickness of the liquid crystal display unit. It might be also contemplated to increase the thickness of the polarizing sheet 20, but this has the same drawback as described above. Therefore, it is desired to provide a liquid crystal display unit wherein contact between the polarizing sheet 20 and the first glass sheet 4 can be prevented irrespective of the size of the display face.

In addition, it has been understood that interference fringes which must be eliminated are caused by contact between the polarizing sheet and the first glass plate, but their occurrences are not limited to the described particular combination. Generally, interference fringes can occur when two light transmissible sheets are combined. Therefore, any light transmissible sheet placed on a liquid crystal display element involes a similar problem of interference fringes.

SUMMARY OF THE INVENTION

According to the present invention, there is provided means for preventing contact between light transmissible sheets laminated in the upper region of a liquid crystal display element.

In brief, the invention is a reflection type liquid crystal display unit including a liquid crystal display element, at least one light transmissible sheet disposed on one surface of said liquid crystal display element, and a reflecting sheet disposed on the other surface of said liquid crystal display element, characterized in that means is provided for forming a clearance between the light transmissible sheet and the liquid crystal display element. The clearance forming means has a predetermined height in a pattern geometrically distributed over the interface between the light transmissible sheet and the liquid crystal element.

In a preferred embodiment of the invention, the light transmissible sheet is a polarizing sheet. This polarizing sheet preferably comprises a transparent resin sheet, and the clearance forming means is in the form of projections formed on said resin sheet by embossing the latter. The formation of projections by directly embossing the polarizing sheet in this manner is not readily foreseeable and provides an increased yield in the production of polarizing sheets. The reason is as follows.

It has been considered that even slight scratches on polarizing sheets have delicate influences on the polarizing characteristics, and only flawless polarizing sheets have been passed as acceptable parts. However, it has been very difficult to produce such polarizing sheets in a flawless condition and then produce liquid crystal display units without scratching such flawless sheets. As a result, the yield has been poor, resulting in increased manufacturing costs of acceptable parts. In view of these facts those skilled in this art considered it to be very important that such polarizing sheets should not be exposed to any operation impairing the flawless surface quality. However, according to the invention it has been found that geometrically distributed projections formed on a polarizing sheet by embossing are very beneficial for the present purposes since these projections are formed in orderly arrangement. Moreover, such arrangement gives an impression that the easy to view quality of the display section has been improved.

According to another preferred embodiment of the invention, a light transmissible sheet means comprises first and second light transmissible sheet members to be successively placed on the liquid crystal display element. Preferably, the first light transmissible sheet member is formed as a transparent sheet which does not disturb polarized light (e.g., a cast film), while the second light transmissible sheet member is formed as a polarizing sheet member. The first light transmissible sheet member, which is a usual transparent sheet, is formed on each surface thereof with a plurality of geometrically distributed projections. As a result, a clearance is advantageously formed between the first light transmissible sheet member and the liquid crystal display element and between the latter and the second light transmissible sheet member. According to this embodiment, since the polarizing sheet which constitutes the first light transmissible sheet is not subjected to any treatment, there is no danger of detracting from the polarizing characteristics of the polarizing sheet.

In another embodiment of the invention, the clearance forming means is in the form of a mesh sheet. With this arrangement, it is possible to form a clearance in accordance with the thickness of the mesh sheet without detracting from the light transmissibility.

Accordingly, a principal object of the invention is to provide a liquid crystal display unit which is free from interference fringes and easy to view.

Another object of the invention is to provide a construction effective to prevent occurrence of interference fringes in a liquid crystal display unit having a relatively large display face.

A further object of the invention is to provide a liquid crystal display unit capable of giving an impression that the quality of the display section has been improved.

These and other objects and features of the invention will become more apparent from the following detailed description with reference to the accompanying drawings.

BRIEF DESCRIPTION OF THE DRAWINGS

FIG. 6 is a view of the cross-sectional construction of an embodiment of the invention shown disassembled;

FIG. 7 is a diagrammatic view of a device for embossing a polarizing sheet used in FIG. 6;

FIG. 8 is an enlarged plan view of a polarizing sheet embossed by the device shown in FIG. 7;

FIG. 9 is an enlarged section of a polarizing sheet embossed by the device shown in FIG. 7;

FIG. 10 is a view of the cross-sectional construction of another embodiment of the invention shown disassembled; and FIG. 11 is an exploded perspective view of a further embodiment of the invention.

DETAILED DESCRIPTION OF THE PREFERRED EMBODIMENTS

Figure 5:
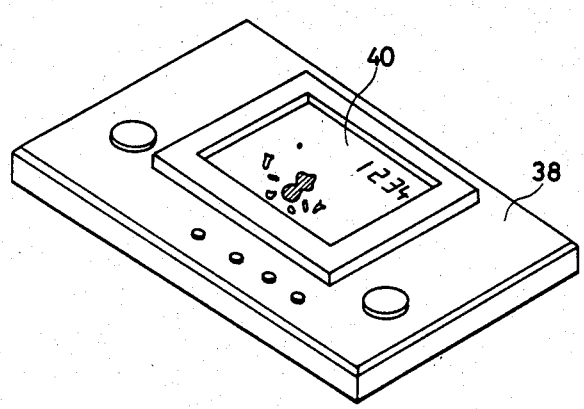
FIG. 5 is a perspective view showing a game device in which a liquid crystal display unit of the present invention can be advantageously used.

According to the invention, there is advantageously provided a liquid crystal display unit having a relatively large display face such as the display face 40 of a game device shown in FIG. 5.

Figure 1:
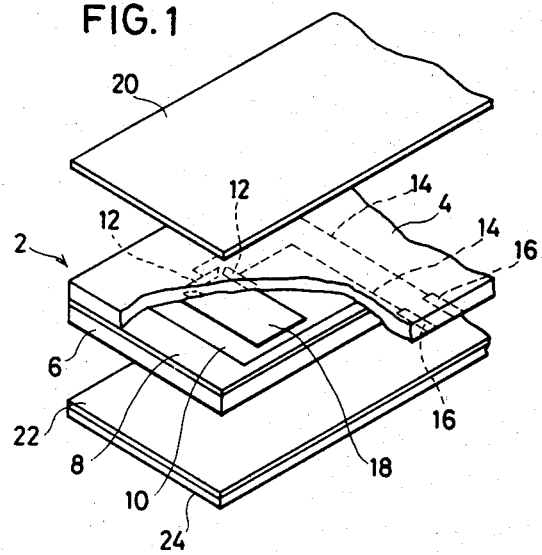
FIG. 1 is a perspective view of a typical prior art liquid crystal display unit shown disassembled.
Figure 2:
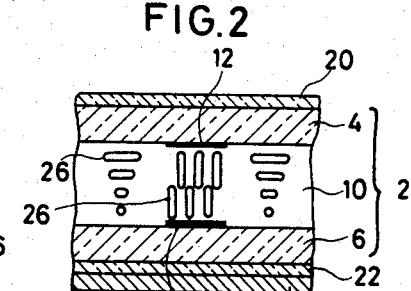
FIG. 2 is a diagrammatic view of the cross-sectional construction of a conventional TN-FEM liquid crystal display unit.
Figure 3:
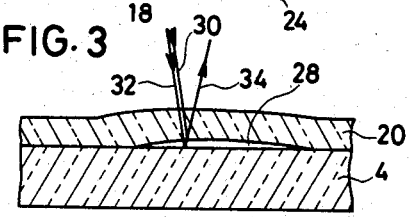
FIG. 3 is an optical model view for explanation of problems in conventional liquid crystal display units.
Figure 4:
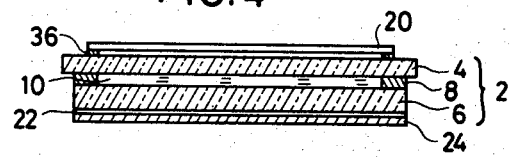
FIG. 4 is a cross-sectional view of a prior art liquid crystal display unit which is of interest to the present invention.

Referring to FIG. 6, the construction shown therein is substantially the same as the one shown in FIG. 4 except that the polarizing sheet 20 and spacer 36 shown in FIG. 4 are replaced by a polarizing sheet 42. Like parts are given like reference numerals, and a description thereof will be omitted.

The polarizing sheet 42 is obtained, e.g., by forming a polarizing film on a triacetate sheet. The polarizing sheet 42 is embossed, whereby at least one surface (in this example, the surface facing to the first glass sheet 4) is formed with a plurality of projections 44.

Referring to FIGS. 7 to 9, the polarizing sheet 42 is passed between a pair of rollers 46 and 48. One roller 46 is an embossing roller outer surface of which is formed with a plurality of relatively small quadrangular pyramidal projections geometrically distributed in an orderly arrangement. The roller 48 has its outer surface formed of relatively elastic paper. The rotative shaft of the paper roller 48 is supported in a fixed position, while the rotative shaft of the embossing roller 46 is supported in a lever 54 pivoted at a fulcrum 52. The lever 54 has a weight 56 suspended from the other end thereof. Thus, the embossing roller 46 exerts on the paper roller 48 a pressure correlated with the heaviness of the weight 56.

The embossing roller 46 and the paper roller 48 are synchronously driven for rotation in the direction of the arrows. The polarizing sheet 42 is moved through between the rollers 46 and 48. Preferably, the polarizing sheet 42 is heated immediately before it is inserted between the rollers 46 and 48. The heating temperature is, e.g., between 60° C. and 100° C. Such heating has the advantage of increasing the embossing rate.

The polarizing sheet having passed between the rollers 46 and 48 has formed thereon quadrangular pyramidal projections 44 shown in FIG. 8. The projections 44 are orderly distributed in a geometrical pattern. Further, the projections 44 are uniform in height. If, therefore, the polarizing sheet 42 thus obtained is disposed with its projections 44 facing the first glass sheet 4, as shown in FIG. 6, then it is possible to form a clearance of uniform thickness between the polarizing sheet 42 and the first glass sheet 4. Preferably, the positions of the projections 44 on the polarizing sheet will be so selected that they do not interfere with the identification of a display pattern provided by the liquid crystal display element 2.

As best shown in FIG. 9, it often occurs that said embossing operation produces projections 58 also on the surface opposite to the one formed with the projections 44. This is believed to result from a reaction to the projections 50 on the embossing roller 46 being pressed against the polarizing sheet 42. There is a tendency that the projections 58 project the more, the more the height of the projections 50 on the embossing roller 46 exceeds the thickness of the polarizing sheet 42. If, therefore, suitable embossing conditions are selected, it is possible to form the projections 44 and 58 on the opposite surfaces of the polarizing sheet at the same time. This has an important meaning in an embodiment shown in FIG. 10 to be presently described.

Referring to FIG. 10, a liquid crystal display element 2, a polarizing sheet 22 and a reflecting sheet 24 are of the same construction as those shown in FIG. 6. Therefore, a description thereof will be omitted, and dissimilar arrangements alone will be described. Successively placed on the first glass sheet 4 of the liquid crystal element 32 are a transparent protective sheet 60 and a polarizing sheet 62. The protective sheet 60 is made of transparent resin or the like. The polarizing sheet 62 is of the same arrangement as the conventional polarizing sheet 20 (FIGS. 1 through 4).

The protective sheet 60 is embossed in the manner described with reference to FIGS. 7 through 9. The first glass sheet 4, which is a light transmitting sheet, and the polarizing sheet 62 are disposed on the opposite sides of the protective sheet 60. Therefore, there is a possibility of causing interference fringes between the protective sheet 60 and the polarizing sheet 62 and between the protective sheet 60 and the first glass sheet 4. Accordingly, clearances must be formed in these two interfaces to avoid interference fringes. To achieve this, it is preferable to provide projections distributed on the opposite surfaces of the protective sheet 60, whereby said two clearances can be formed simultaneously. The formation of such projections on the opposite surfaces of the protective sheet 60 can be achieved in a single process by the method described with reference to FIG. 9. Instead of this method, the one shown in FIG. 7 may be applied to the opposite surfaces of the protective sheets. According to such embodiment shown in FIG. 10, since no treatment is applied to the polarizing sheet 62, which is optically delicate, it is possible to expect the effects of the invention without deteriorating the polarizing characteristics.

FIG. 11 is an exploded perspective view of a further embodiment of the invention. In this embodiment, a net or mesh layer 64 is used in lieu of the protective sheet 60 shown in FIG. 10. The net or mesh layer 64 may be formed by weaving fine metal wire or filaments of any other suitable material. Such net or mesh layer 64 uniformly defines a clearance correlated with the thickness of the net or mesh layer 64 between the polarizing sheet 62 and the first glass sheet 4. In addition, such net or mesh layer 64 may be bonded to the lower surface of the polarizing sheet 62 before it is combined with the liquid crystal display element 2.

The liquid crystal display unit of the invention described so far can be advantageously applied to display devices requiring a relatively large display face. For example, it is possible to advantageously provide the display face 40 of the game device shown in FIG. 5. In addition, the game device shown in FIG. 5 is disclosed in "TIMEPIECE APPARATUS HAVING GAME FUNCTION" by Gunpei Yokoi and one other filed June 20, 1980 in the United States of America.

While the invention has been fully described with reference to preferred embodiments thereof in connection with the accompanying drawings, it will be possible for those skilled in the art to modify the same without departing from the spirit of the invention. It must be understood that the invention is limited only by the attached claims. For example, the way the projections disclosed as means for forming a clearance is not limited to the illustration and instead other geometrical distribution may be employed. Further, the liquid crystal display element is not limited to the TN-FEM type and instead it may be of the dynamic scattering type.

What is claimed is:

1. A liquid crystal display unit comprising: a liquid crystal display element (2) comprising a first transparent sheet (4), a second transparent sheet (6) arranged to face said first transparent sheet (4), whereby a gap is formed between the first and second transparent sheets, first electrode means (12) formed on one surface of said first transparent sheet, second electrode means (18) formed on one surface of said second transparent sheet and arranged to face said first electrode means, and liquid crystal means placed in said gap defined between one surface of each of said two transparent sheets; a reflecting sheet (24) disposed relative to the other surface of said second transparent sheet (6); first polarizing sheet means (62) disposed relative to the other surface of said first transparent sheet; second polarizing sheet means (22) located between said second transparent sheet and said reflecting sheet; protective sheet means (60) formed as a transparent resin sheet and located between said first transparent sheet and said first polarizing sheet (62); and first and second clearance means (44, 58) for forming a first clearance between said first transparent sheet (4) and said protective sheet (60) and a second clearance between said first polarizing sheet (62) and said protective sheet (60), said first and second clearance means each comprising a plurality of first and second projections (44, 58) each distributed uniformly in a geometric pattern over each surface of said protective sheet (60), said projections having a predetermined uniform height, and wherein said first and second projections are simultaneously formed by embossing said protective resin sheet (60).

2. The liquid crystal display unit of claim 1, wherein said first and second transparent sheets are glass sheets (4, 6).

3. The liquid crystal display unit of claim 1, used as a display unit in a game device.

* * * * *